United States Patent Office 2,727,922
Patented Dec. 20, 1955

2,727,922

HALO-FORMAMIDINE SALTS AND METHOD OF PREPARATION

Hans Z. Lecher, Plainfield, and Clement L. Kosloski, Bound Brook, N. J., assignors to American Cyanamid Company, New York, N. Y., a corporation of Maine No Drawing. Application March 25, 1953,
Serial No. 344,662

3 Claims. (Cl. 260—564)

This invention relates to salts of halo-foramidines. More particularly, it relates to halide and nitrate salts of halo-formamidines and their method of preparation.

Cyanamide, $NCNH_2$, is an extremely reactive compound and has been used in many laboratory synthesis. In spite of this reactivity and the fact that it has been known for over a century, only it polymerization products, dicyandiamide and melamine, have found extensive industrial use. Monomeric cyanamide itself has been used but little on an industrial scale.

Its reactivity, which makes cyanamide such a desirable starting material for a variety of synthesis, renders it at the same time quite unstable. It has a great tendency to polymerize and/or to hydrolyze. Only under very specific conditions can it be kept for any length of time. An aqueous solution of cyanamide is very sensitive to changes in pH and is reasonably stable only at a pH of approximately 5. It is so sensitive to alkali that it cannot be kept in glass containers but has to be stored, e. g., in paraffined oak barrels. Solid cyanamide is stable only when isolated from an aqueous solution at the above stated pH and must be kept in stainless steel containers.

Cyanamide is not only difficult to store but also difficult to manufacture on an industrial scale. This is unfortunate since its calcium salt is the main constituent of fertilizer lime nitrogen, which is available at extremely low cost. While conversion of the latter into free cyanamide by treatment with water and a weak acid, such as carbonic acid, is practiced commercially, it is not well suited for preparing really stable cyanamide solutions or solid cyanamide. Extreme solubility of cyanamide in water, moreover, makes isolation of solid cyanamide difficult.

In contrast to cyanamide, chloro-formamidine hydrochloride,

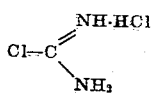

is a well-crystallized, stable substance which can be kept indefinitely in its dry state. It is very easily converted into cyanamide, for instance, by treating with sodium bicarbonate in water. Moreover, chloro-formamidine hydrochloride shows most of the reactions of cyanamide itself. It has been prepared in the past by combining free cyanamide with hydrogen chloride.

Chloro-formamidine hydrochloride, however, has remained a laboratory curiosity. This is because the only method of preparation is from free cyanamide. Its preparation, therefore, entails all the difficulties encountered in the preparation of cyanamide itself. While a corresponding halo-formamidine salt, bromo-formamidine hydrobromide, has been prepared, its preparation is similar and involves similar difficulties.

There remains, therefore, a need for a process for producing storage stable derivatives of cyanamide, such as chloro- and bromo-formamidine salts, which may be easily converted to free cyanamide. Such a process must be free of the numerous difficulties of known laboratory methods for producing such compounds. It should be simple in operation and readily adapted to commercial operation in conventional apparatus. In addition, it should require only materials which are readily available and inexpensive.

Surprisingly, in view of the long period that such a process has been in demand without one being provided, it has now been discovered that chloro- and bromo-formamidine salts may be prepared directly by treating lime nitrogen with hydrochloric and hydrobromic acids. This discovery is the more surprising considering the great instability of cyanamide, the calcium salt of which is the main constituent of lime nitrogen. That these halo-foramidine salts can be prepared directly from lime nitrogen without polymerization and/or hydrolysis of the cyanamide is totally unexpected. This unexpected reaction, moreover, proceeds with surprising ease.

In general, the process of this invention comprises treating lime nitrogen with hydrochloric or hydrobromic acid. This is most conveniently done by adding comminuted lime nitrogen, preferably granular in form, to the desired acid with stirring. After completion of the reaction, solid carbonaceous matter is separated. Depending on the acid employed, a solution of chloro-formamidine hydrochloride or bromo-formamidine hydrobromide is obtained.

Lime nitrogen used in the process may be a commercial product prepared by the Frank-Caro process, Polzenius process or by any other suitable process. However, a lime nitrogen free of calcium chloride is preferred to avoid undue contamination of the final product. It is also preferable to use the crude, comminuted converter product before it is "hydrated" or "oiled." Such a commercial product contains as its main constituents calcium cyanamide with considerable quantities of calcium oxide. Calcium salts such as calcium chloride are sometimes also present. In addition, it contains other minor contaminants such as free carbon, calcium carbide and metal salts other than calcium.

In general, the amount of acid employed may vary considerably. Certain requirements, however, must be fulfilled. There must be at least a sufficient quantity of acid to (1) convert all calcium and other metal compounds to their respective halides, and (2) provide two molecules of acid to combine with the cyanamide, based on the real content of calcium cyanamide. To insure complete reaction, it is preferable to use an amount of acid about 20–30% in excess of this theoretical amount. Greater than about 30% is generally unnecessary and usually undesirable for reasons to be subsequently discussed. Concentration of the acid may also vary widely. It is most economical, however, to employ commercially available grades. For preparation of the chloro-formamidine salts, 20° Bé. hydrochloric acid is preferred, while for preparation of the bromo-formamidine salts, preferred hydrobromic acid is the azeotrope containing 48% hydrogen bromide.

Reaction temperatures may, in general, cover a broad range. However, while it is possible to proceed at temperatures as high as 95° C., it is desirable, when the time cycle is long, to operate at lower temperatures to avoid possible hydrolysis. In such instance, a preferred temperature is about 35° C. or less. Since the reaction is exothermic, cooling is necessary to maintain the desired temperature. This may be done in any conventional manner.

Resultant chloro-formamidine hydrochloride or bromo-formamidine hydrobromide can be precipitated from solution by cooling. The crystals so obtained may then be isolated by filtration, decantation or other suitable means. The isolated product is purified by washing with a small amount of cool, diluted hydrohalic acid liquor, and then with acetone to facilitate drying. The crystals are slightly contaminated by calcium chloride or calcium bromide. Chloro-formamidine hydrochloride is less soluble in hydrochloric acid than in water. However, to obtain the optimum isolated yield, it is disadvantageous to use a large excess of hydrochloric acid because it salts out calcium chloride. This must then be removed by washing so that the final yield of isolated product becomes actually lower.

If a calcium-free product is desired, two different operating methods are possible. In the first, lime nitrogen is added to a mixture of sulfuric and hydrochloric acids. The amount of the sulfuric acid employed is sufficient to precipitate the calcium content of the lime nitrogen as calcium sulfate. While this operation is feasible, it results in a bulky cake of calcium sulfate and carbon which is difficult to wash out. The second method consists in separating the carbon as described above and then precipitating the calcium content as the sulfate.

The new group of halo-formamidine salts of this invention are capable of representation by the formula:

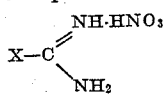

wherein X is a halogen selected from the group consisting of chlorine and bromine.

Chloro-formamidine nitrate may be prepared from chloro-formamidine hydrochloride. This compound is very easy to precipitate as a well-crystallized product from a solution of chloro-formamidine hydrochloride by addition thereto of nitric acid. The optimum amount of nitric acid depends upon the concentration of the chloro-formamidine hydrochloride solution and the amount of hydrochloric acid present. Accordingly, it has to be determined for each individual set of conditions. The nitrate is soluble in water but is very sparingly soluble in dilute nitric acid. It is more soluble in an excess of nitric acid or hydrochloric acid. Under proper conditions yield of 70% theory can be isolated without difficulty. The conversion of the nitrate to free cyanamide can be easily effected in aqueous solution by the aid of bicarbonate.

Chloro-formamidine nitrate is a colorless, crystalline product. It is very soluble in water and in concentrated nitric acid, but almost insoluble in dilute nitric acid. The compound melts with decomposition at 122° C. but prolonged heating causes decomposition at a lower temperature. Decomposition is catalyzed by moisture. In its dry state, this compound is stable up to about 80° C. and decomposes on prolonged heating over 90° C., whereas in the presence of moisture it is stable up to about 60° C. and decomposes above about 70° C. The decomposition products are $CO_2$, $N_2O$, $NOCl$, $Cl_2$ and a solid residue which is the nitrate of a condensation product. The gases comprise about 90% of the original weight of chloro-formamidine nitrate. When heated gently in aqueous solution, chloro-formamidine nitrate hydrolyzes to urea nitrate.

The corresponding nitrate of bromo-formamidine can be prepared in the same fashion as the nitrate of chloro-formamidine. However, it is unstable and decomposes quickly.

Halo-formamidine salts, besides being stable derivatives of free cyanamide, offer great possibilities as starting materials for a variety of syntheses.

The following examples further illustrate the invention, but are in no way intended to be limiting. Unless otherwise noted, all parts are by weight.

EXAMPLE 1

Chloro-formamidine hydrochloride

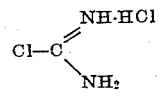

50 parts of 6 x 16 mesh, granular, unoiled, non-hydrated lime nitrogen containing approximately 69% calcium cyanamide is added portionwise and with stirring to 290 parts of cooled 20° Bé. hydrochloric acid. When addition of lime nitrogen is complete, the mixture is agitated for an additional few hours until all of the lime nitrogen granules are disintegrated. The carbon residue is then removed by filtration, leaving a clear solution with a high content of chloro-formamidine hydrochloride. A considerable portion of it may be crystallized by cooling and isolated by filtration. Washing may be conducted with a small amount of cold, dilute hydrochloric acid. Subsequent washing with acetone facilitates the drying operation.

EXAMPLE 2

To the clear chloro-formamidine hydrochloride solution of Example 1 is added 61 parts of sulfuric acid (95.6%) and precipitated calcium sulfate filtered off. Chloro-formamidine hydrochloride is isolated from the resulting filtrate by evaporation under reduced pressure.

EXAMPLE 3

Chloro-formamidine nitrate

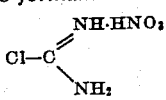

The procedure of Example 1 is followed to produce a clear chloro-formamidine hydrochloride solution. To this solution is added 78 parts of concentrated nitric acid (69.6%). The solution is cooled and chloro-formamidine nitrate isolated by filtration. The product is washed with cold, dilute nitric acid and with acetone, followed by air drying.

EXAMPLE 4

The following data show the influence on the reaction, of temperature, and concentration of and amount of hydrochloric acid on the method of Example 3.

TABLE I.—INFLUENCE OF TEMPERATURE

| Temp., °C. | Parts of Lime Nitrogen | Parts of Hydrochloric acid (20° Bé.) | Parts of Chloro-formamidine Nitrate Isolated |
|---|---|---|---|
| 95 | 50 | 290 | 30.5 |
| 50 | 50 | 290 | 39 |
| 10 | 50 | 290 | 41.5 |
| 10 | 50 | 348 | 31.5 |

TABLE II.—INFLUENCE OF HYDROCHLORIC ACID CONCENTRATION

| Conc. of Hydrochloric Acid | Parts of Hydrochloric Acid | Parts of Lime Nitrogen | Temp., °C. | Parts of Chloro-Formamidine Nitrate Isolated |
|---|---|---|---|---|
| 18.25% | 655 | 50 | 10 | 27.6–34.3. |
| 18.25% | 435 | 50 | 10 | 20. |
| 31.45% | 348 | 50 | 10 | 31.5. |
| 31.45% | 290 | 50 | 10 | 30.5–41.5. |
| Saturated with HCl | 217 | 50 | 10 | 30.7–34. |

TABLE III.—INFLUENCE OF AMOUNT OF HYDROCHLORIC ACID

| Amount of Hydrochloric Acid | Conc. of Hydrochloric Acid | Parts of Lime Nitrogen | Temp., °C. | Parts of Chloro-Formamidine Nitrate Isolated |
|---|---|---|---|---|
| Theoretical | 5 N | 50 | 10 | 20. |
| 50% excess | 5 N | 50 | 10 | 27.6–34.3. |
| 25% excess | 20° Bé | 50 | 10 | 41.5. |
| Do | 20° Bé | 50 | 50 | 39. |
| Do | 20° Bé | 50 | 95 | 30.5. |
| 50% excess | 20° Bé | 50 | 10 | 31.5. |
| Great excess | Saturated with HCl | 50 | 10 | 30.7–34. |

EXAMPLE 5

*Bromo-formamidine hydrobromide*

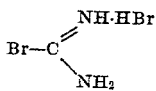

50 parts of lime nitrogen of Example 1 is added portionwise and with stirring to 420 parts of cooled hydrobromic acid (48.6%). The reaction mixture is agitated for an additional few hours until all of the lime nitrogen granules are disintegrated. After separation of carbon residue, the clear light brown filtrate is cooled, the precipitate filtered, and washed with dilute hydrobromic acid and acetone to isolate colorless, crystalline bromo-formamidine hydrobromide. The product gives off fumes at 215° C. and melts with decomposition at 220–225° C.

We claim:
1. A new product of the formula:

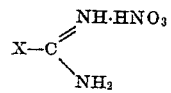

in which X is a halogen selected from the group consisting of chlorine and bromine.

2. As a new product chloro-formamidine nitrate.

3. The method of preparing halo-formamidine hydronitrates which comprises treating a solution of a halo-formamidine hydrohalide selected from the group consisting of chloro-formamidine hydrochloride and bromo-formamidine hydrobromide with nitric acid.

References Cited in the file of this patent

Hantsch et al.: Liebig's Annalen 314, 366 (1900).
Werner: J. Chem. Soc. 109, 1325–7 (1916).